United States Patent Office 2,775,132
Patented Dec. 25, 1956

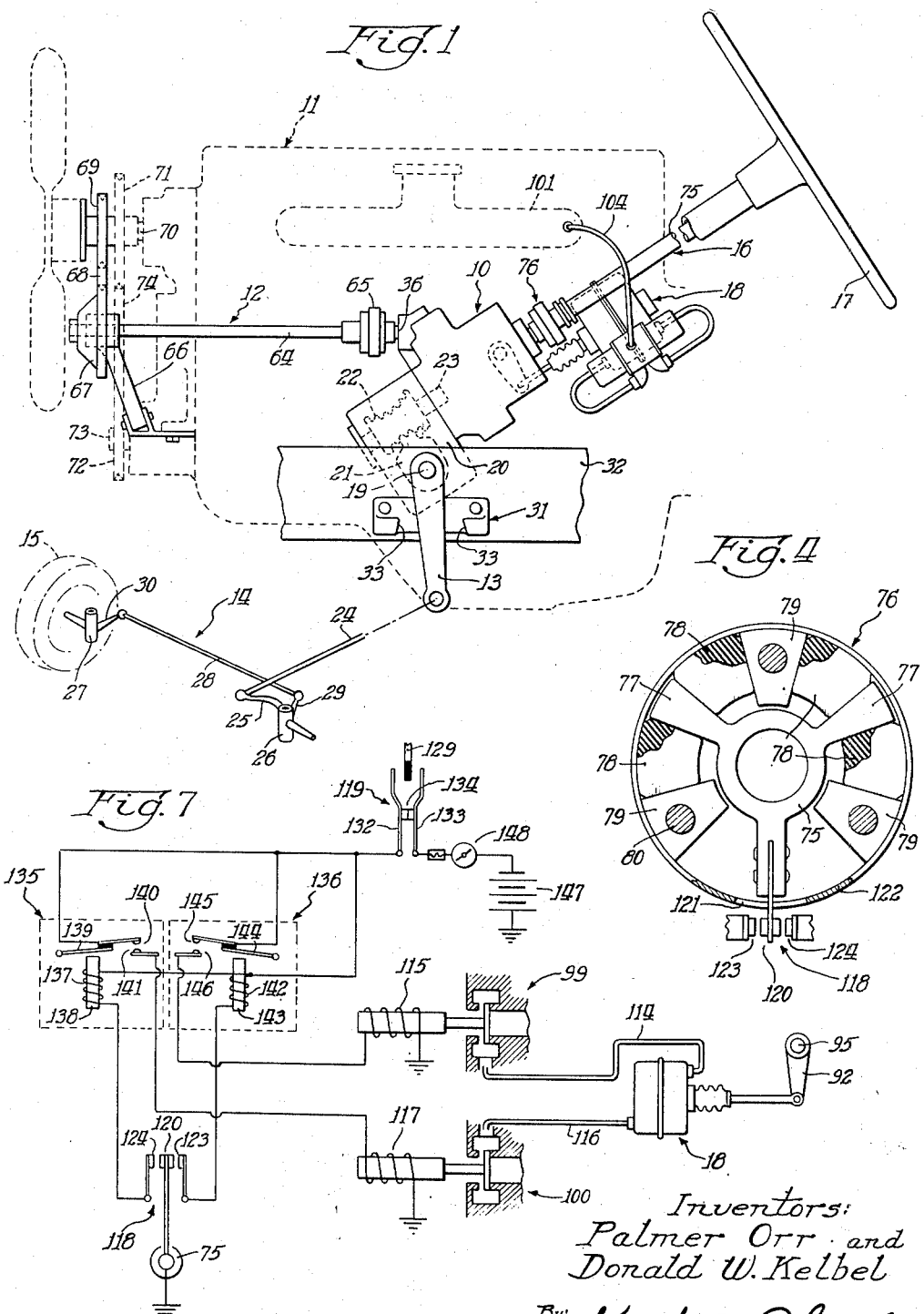

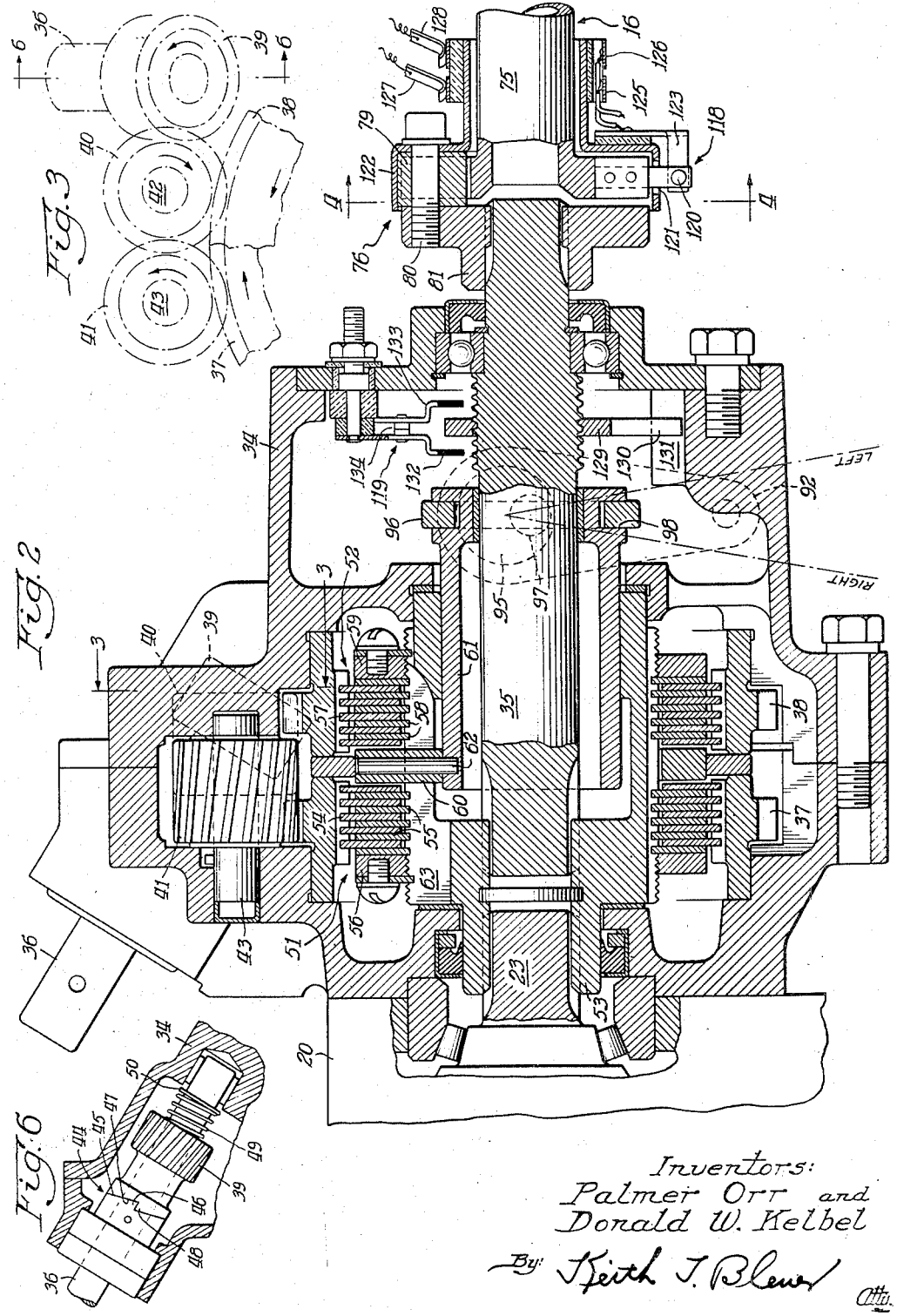

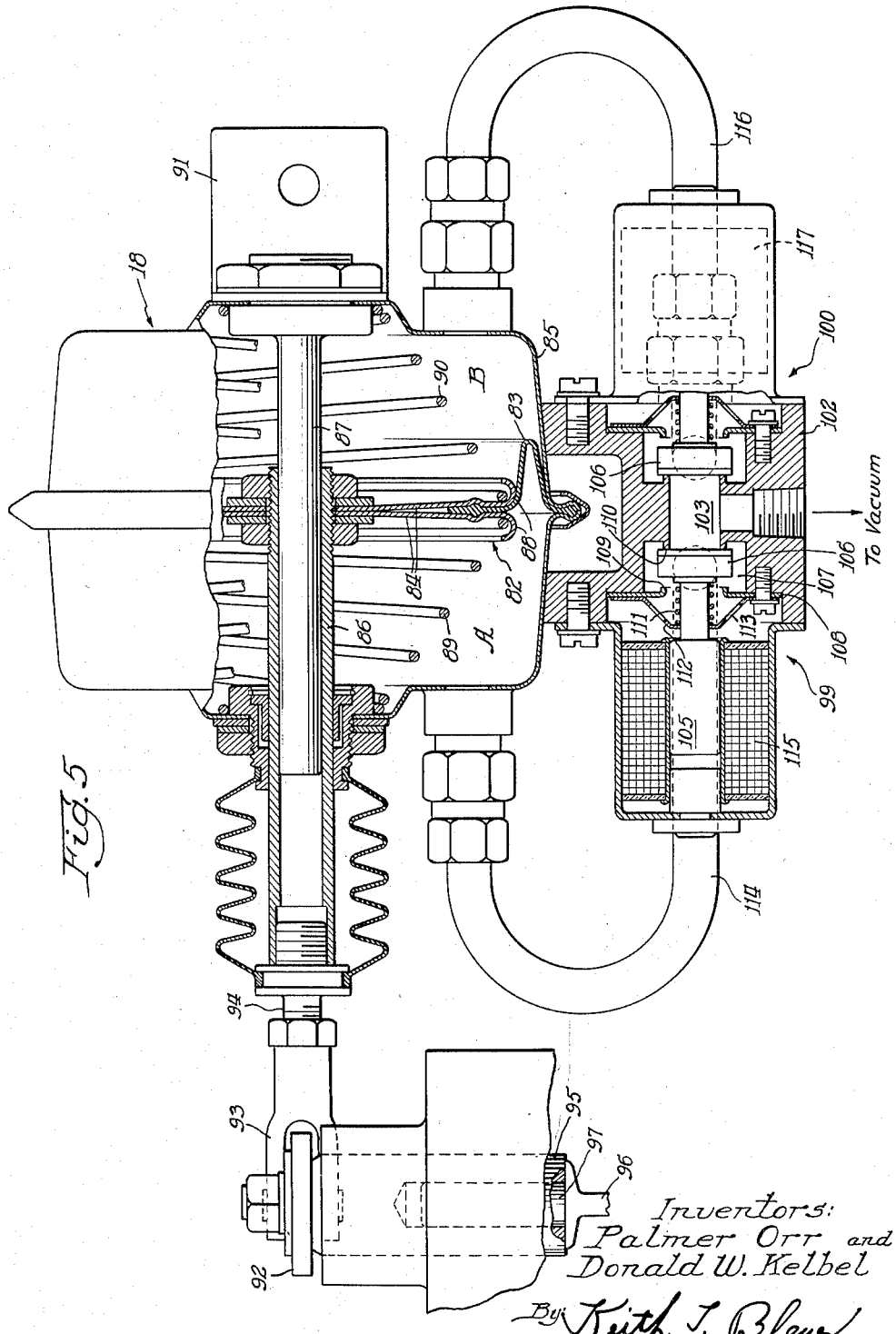

2,775,132
POWER STEERING MECHANISM

Palmer Orr and Donald W. Kelbel, Muncie, Ind., assignors to Borg-Warner Corporation, Chicago, Ill., a corporation of Illinois Application December 6, 1952, Serial No. 324,556

14 Claims. (Cl. 74—388)

Our invention relates to power steering mechanism for automotive vehicles and more particularly to such steering mechanism which is electrically controlled.

It has been proposed, previous to our invention, that a pair of friction clutches driven from the crank shaft of the vehicle engine may be utilized for augmenting the vehicle steering action from the vehicle steering hand wheel for turning the front steerable, dirigible wheels of the vehicle. The clutches are engaged by a screw effective to move a pressure plate in one direction or the other to engage one or the other of the clutches depending on the direction of turning movement given the steering hand wheel.

It is an object of the present invention to provide a servo-motor for engaging one or the other of these clutches in lieu of the screw so as to reduce and minimize the manual force necessary for steering the vehicle. It is contemplated that the servo-motor may be electrically controlled by means of a switch actuated in accordance with relative movement between the parts of a resilient connection between the vehicle steering hand wheel and the dirigible road wheels.

It is another object of the invention to provide a mechanism for preventing engagement of the clutches in such a power steering unit after a predetermined steering movement of the vehicle wheels has taken place, so that there will not be excessive wear on the clutches and the steering road wheels will not be caused to turn through such degree that they may contact the frame or other stationary parts of the vehicle. More particularly, it is an object to provide a switch which is opened when the vehicle wheels approach their maximum turned positions for deenergizing the controls for the friction clutches to maintain the clutches disengaged as long as the switch is opened.

The invention consists of the novel constructions, arrangements and devices to be hereinafter described and claimed for carrying out the above stated objects and such other objects as will appear from the following description of a preferred form of the invention illustrated with reference to the accompanying drawings, wherein:

Fig. 1 is a side elevational view of a power steering mechanism, including a power steering gear, embodying the principles of the invention;

Fig. 2 is a longitudinal sectional view of the power steering gear;

Fig. 3 is a schematic sectional view of certain driving mechanism in the power steering gear taken on line 3—3 of Fig. 2;

Fig. 4 is a sectional view taken on line 4—4 of Fig. 2;

Fig. 5 is a sectional view of vacuum operated servo-motor mechanism for operating the steering gear;

Fig. 6 is a sectional view taken on line 6—6 of Fig. 3; and

Fig. 7 is a schematic electrical circuit diagram of controls for the vacuum operated servo-motor.

Like characters of reference designate like parts in the several views.

Referring now to Fig. 1 in particular, the illustrated power steering mechanism comprises a power steering gear unit 10 receiving power from the vehicle engine 11 through power shafting 12 and having a pitman arm 13 connected by the usual linkage 14 with the front steering dirigible wheels 15 of the vehicle, a shaft connection 16 with the unit 10 and with the usual steering hand wheel 17 of the vehicle, and a vacuum motor 18 for controlling the unit 10.

The pitman arm 13 is secured to a shaft 19 swingably mounted in a casing 20. A toothed sector 21 is fixed to the shaft 19 and is in mesh with a worm 22 fixed on an output shaft 23. The pitman arm 13 is connected by means of a steering gear connecting rod 24 with a steering knuckle gear rod arm 25 fixed on the left steering knuckle 26 which is pivotally mounted and supports the left steering wheel 15 of the vehicle. The left steering knuckle 26 is connected with the right steering knuckle 27, which is pivotally mounted and supports the right steering wheel 15, by means of a tie rod 28 and knuckle arms 29 and 30 formed respectively on the knuckles 26 and 27. A pitman arm stop 31 is fixed to the vehicle frame 32 and has two stop portions 33 adapted to abut against the pitman arm 13 and limit its swinging movement and thereby the vehicle turning movement of the dirigible wheels 15.

The steering gear unit 10, for swinging the arm 13 under the control of the vehicle operator by power from the engine 11, comprises a casing 34 having a control shaft 35 and the output shaft 23 journaled therein in axial alignment. A power input shaft 36 is also journaled within the casing 34 and extends at a skew angle with respect to the shafts 35 and 23. Two ring gears 37 and 38 are journaled within the casing 34 and are driven in opposite directions from the shaft 36. The mechanism for driving the ring gears includes a gear 39 rotatable with the shaft 36 in mesh with a gear 40 and a gear 41 in mesh with the gear 40. The gears 40 and 41 are rotatably disposed within the casing 34 by means of shafts 42 and 43, respectively, on which the gears are mounted and which are fixed in the casing 34. The gear 40 is also in mesh with the ring gear 38, and the gear 41 is also in mesh with the ring gear 37, so that upon rotation of the gear 39, the ring gears 37 and 38 will be driven in opposite directions. The gear 39 is axially slidably disposed on the shaft 36 and is connected to the shaft 36 by a one-way clutch connection 44. The clutch connection 44 is provided by means of a cam surface 45 and a tooth 46 formed on the shaft 36 and a mating cam surface 47 and a tooth 48 formed on the gear 39. A spring 49 is disposed between the gear 39 and a stop ring 50 fixed in the shaft 36.

A friction clutch 51 is provided for connecting the ring gear 37 with the output shaft 23, and a friction clutch 52 is provided for connecting the ring gear 38 with the shaft 23. A clutch hub 53 is splined to the shafts 35 and 23 and directly connects the shafts. The friction clutch 51 comprises a plurality of clutch discs 54 splined within the ring gear 37 and a plurality of clutch discs 55 splined on to the clutch hub 53. The clutch discs 54 and 55 are alternately stacked and a pressure plate 56 is fixed to the clutch hub 53 at one end of the stacked discs 54 and 55. The clutch 52 is similar to the clutch 51 except that it is reversely arranged and comprises stacked clutch discs 57 and 58. The discs 57 are splined within the ring gear 38, and the discs 58 are splined on to the clutch hub 53. A pressure plate 59 is fixed on the clutch hub 53 at one end of the stacked discs 57 and 58.

An axially movable pressure plate 60 is disposed between the clutches 51 and 52 and is fixed to a sleeve 61 by means of pins 62. The sleeve 61 is disposed about the shaft 35 and is axially movable with respect to the shaft 35. The pins 62 and portions of the pressure plate 60 extend through slots 63 provided in the clutch hub 53. The driving connection 12 comprises a shaft 64 connected by means of a resilient coupling 65 of any suitable construction with the shaft 36. The shaft 64 is journaled in a bracket 66 fixed with respect to the vehicle engine 11 and has a pulley 67 fixed on the shaft adjacent the bracket. A belt 68 connects the pulley 67 with another pulley 69 fixed on the fan shaft 70 of the engine 11. The fan shaft 70 is driven in accordance with well-known practice by means of a pulley 71 fixed on the shaft 70, a pulley 72 fixed on the crank-shaft 73 of the engine 11 and a belt 74 connecting the pulleys 71 and 72.

The connection 16 to the steering hand wheel 17 comprises a shaft 75 on which the steering wheel 17 is mounted and a flexible coupling 76 connecting the shafts 75 and 35. The flexible coupling 76 comprises a pair of fingers 77 formed on the lower end of the shaft 75, flexible rubber blocks 78 and drive blocks 79 fixed by means of bolts 80 to a coupling hub 81 splined on the shaft 35. The rubber blocks 78 are disposed between the fingers 77 and the drive blocks 79 as shown in Fig. 4. As will be hereinafter described, the fingers 77, the rubber blocks 78 and the drive blocks 79 transmit sufficient force through the shaft 35, the clutch hub 53 and the shaft 23 for steering the vehicle under light steering loads.

The sleeve 61 is shifted by means of the vacuum motor 18. The vacuum motor 18 comprises a piston 82 formed by a flexible diaphragm 83 and a pair of annular sheet metal members 84. The diaphragm 83 is fixed at its outer periphery within a casing 85, centrally between the ends of the casing, and the diaphragm 83 at its inner periphery is fixed between the sheet metal members 84. The annular members 84 are fixed on a sleeve 86 which is slidably disposed on a central shaft 87 fixed with respect to one end of the casing 85, with the sleeve 86 being slidably journaled and extending through the casing 85 at its other end. The piston 82 forms two chambers A and B. The annular members 84 are provided with return bent portions 88 on their outer peripheries, and compression springs 89 and 90 are provided between the opposite ends of the casing 85 and the annular members 84, fitting within the return bent peripheries of the members 84, as shown. A bracket 91 is fixed on an end of the shaft 87 by means of which the motor 18 is anchored with respect to any fixed portion of the vehicle.

The sleeve 86 is connected with a shift lever 92 by means of a clevis 93 and an intermediate connecting member 94 fixed with respect to the sleeve 86 and adjustably fixed with respect to the clevis 93. The shift lever 92 is fixed on a shaft 95 rotatably journaled in the casing 34, and a shift fork 96 having a pilot shaft 97 is carried by the shaft 95 with the shaft 97 eccentrically disposed with respect to the center of shaft 95. The fork 96 fits within a groove 98 provided in the sleeve 61.

Valves 99 and 100 are provided for connecting either the chamber A or the chamber B in the motor 18 with the fuel inlet manifold 101 of the vehicle engine 11 for thereby causing the vacuum of the manifold to be exerted on either one side or the other of the diaphragm 82. The valves 99 and 100 are disposed in a valve casing 102 having a cavity 103 therein connected by means of a conduit 104 with the manifold 101. The valve 99 comprises a longitudinally movable armature 105 connected with a valve piston 106 disposed in a cavity 107. An annular member 108 is fixed within the casing 102 at one end of the cavity 107 and provides a seat 109 for the piston 106 at one end of the cavity 107. The casing 102 is provided with a seat 110 at the other end of the cavity 107. A compression spring 111 is provided between the piston 106 and a spring retainer element 112 fixed along with the annular member 108 to the casing 102. The spring retainer element 112 is provided with openings 113 therethrough which vent atmospheric pressure through the spring retainer element 108 to the cavity 107 when the piston 106 is in its illustrated position from openings through the casing 102 to atmosphere which are not shown. A conduit 114 connects the chamber A in the servo-motor casing 85 with the cavity 107. An electric solenoid winding 115 surrounds the armature 105 and pulls the piston 106 by means of the armature 105 away from the seat 110 and into sealing contact with the seat 109 against the action of the spring 111 when the winding is energized.

The valve 100 is similar to and has the same parts as the valve 99. The valve 100 and particularly its cavity 107 is connected by means of a conduit 116 with the chamber B of the servo-motor 18, and the armature 105 of the valve 100 is energized and moved by means of an electric solenoid winding 117 which corresponds to the winding 115 for the valve 99.

The vacuum servo-motor 18 is controlled primarily by a steering hand wheel switch 118 and by a limit switch 119. The steering wheel switch 118 is connected with and is actuated by the flexible coupling 76. The shaft 75 carries, in addition to the fingers 77, a contact 120 which extends through a slot 121 in a cup-like element 122 extending around the flexible coupling 76 and fixed with respect to the hub 81 by means of the bolts 80. Two spaced contacts 123 and 124 are carried by, but are insulated from, the cup-like member 122, the contacts 123 and 124 being disposed on opposite sides of the contact 120. The arrangement is such that when sufficient rotative stress is put on the shaft 75 from the steering wheel 17, the rubber blocks 78 will be compressed, and the shaft 75 will rotate with respect to the shaft 35 so as to move the contact 120 into contact with either of the contacts 123 and 124. The contact 123 is connected to a commutator ring 125, and the contact 124 is connected with a commutator ring 126. Electrical conducting brushes 127 and 128 are in contact respectively with the rings 125 and 126. The contact 120 being carried by a shaft 75 is grounded thereby.

The switch 119 comprises a plate 129 which is threaded on the shaft 35 and has a tang 130 slidably disposed in a slot 131 provided in the casing 34. Two resilient switch arms 132 and 133 are carried by the casing 34 and are insulated therefrom and carry contacts 134 which are in contact until the plate 129 is moved by its threaded connection with the shaft 35 to contact and move one or the other of the switch arms 132 and 133.

The electric controls for the solenoid windings 115 and 117 comprises two electrical relays 135 and 136. The relay 135 comprises a winding 137 disposed on a magnetizable core 138 and an armature 139 attracted by the core 138 when it is magnetized by the winding 137. The armature 139 carries a contact 140 movable into contact with a stationary contact 141. The relay 136 is substantially the same in construction as the relay 135 and comprises a winding 142, a core 143, an armature 144, a contact 145 carried by the armature and a stationary contact 146.

The battery 147 of the vehicle has one terminal grounded and has its other terminal connected with the ignition switch 148 of the vehicle. The ignition switch 148 is connected in series with the switch 119, and the switch 119 in turn is connected with the relay contact 140, one end of relay winding 137, the relay contact 145 and one end of the relay winding 142 and supplies voltage to these parts when the switch 119 is closed. The relay contact 141 is connected with one end of the winding 117 which has its other end grounded, and the contact 146 is connected with one end of the winding 115 which has its other end grounded. The opposite end of the relay winding 137 is connected with the switch contact 124, and the opposite end of the relay winding 142 is connected with the switch contact 123. The contact 120 of the switch 118 is grounded.

In operation, the steering hand wheel 17, in accordance with the usual practice, is turned in one direction or the other for the purpose of turning the front dirigible wheels 15 of the vehicle. The steering wheel 17 rotates the shaft 75 fixed to the wheel 17, and if the steering load is light, the movement of the steering wheel 17 is transmitted without amplification directly through the flexible coupling 76, and particularly through the parts 77, 78 and 79, to the dirigible road wheels 15. This turning movement from the flexible coupling 76 is applied through the shaft 35, the clutch hub 53, the shaft 23, the worm 22, the toothed sector 21, the pitman arm 13, the steering gear connecting rod 24, the steering knuckle rod arm 25 connected with the knuckle 26 on which one of the dirigible wheels 15 is mounted, the steering knuckle arm 29, the steering knuckle tie rod 28, the steering knuckle arm 30, and the knuckle 27 on which the other dirigible wheel 15 is mounted. The steering gear comprising the worm 22 and the sector 21 and the connections between the pitman arm 13 and the steering wheels 15 are common and well-known both in construction and operation, and further details are thus not deemed necessary.

Assuming that there is a relatively heavy steering load, as, for example, when the vehicle is being parked, and the steering wheel 17 is turned clockwise for a right turn, the flexible coupling 76 will yield due to the resistance to turning of the shafts 35 and 23 connected through the linkage with the steering wheels 15. The rubber blocks 78 in the flexible coupling 76 in yielding allow the switch contact 120 connected with the shaft 75 to make contact with the contact 123 fixed with respect to the shaft 35 by means of the hub 81. The relay winding 142 is thus energized, a circuit being completed from the ignition switch 148, which is assumed to be in closed condition, through the limit switch 119 and contacts 120 and 123 to ground. The relay armature 144 is thus drawn downwardly to bring the contacts 145 and 146 together thus completing a circuit from the limit switch 119 through the solenoid winding 115 to ground. The armature 105 in the winding 115 is thus drawn into the winding 115 and moves the connected valve piston 106 in a cavity 107 off its seat 110 and on to its seat 109. The vacuum from the manifold 101 is thus applied through the conduit 104, the cavities 103 and 107 and the conduit 114 to the left side of the piston 82 in the servo-motor 18, since the piston 106 in moving opens the cavity 107 with respect to the cavity 103. The piston 82 is thus drawn to the left as seen in Fig. 5, moving the lever 92 in the clockwise direction and through the fork 96 moving the sleeve 61 to the left as seen in Fig. 2. The pressure plate 60, being fixed to the sleeve 61, moves along with the sleeve 61 and packs the clutch discs 54 and 55 together thus engaging the clutch 51. The ring gear 37 is rotated from the crank shaft 73 through the pulley 72, the belt 74, the pulley 71, the shaft 70, the pulley 69, the belt 68, the pulley 67, the shaft 64, the flexible coupling 65, the shaft 36, the one-way clutch 44, the gear 39, and the gears 40 and 41. This engagement of the clutch 51 transmits torque from the ring gear 37 to the shaft 23 and assists the flexible coupling 76 in rotating the shaft 23 in the direction for causing a vehicle turning movement to the right. When the servo-motor 18 has been thus effective to rotate the shaft 23 and thereby the shaft 35 sufficiently corresponding to the turning movement given the steering hand wheel 17, the contact 123 connected with the shaft 35 moves out of contact with the contact 120 and breaks the circuit through the relay winding 142 and deenergizes the solenoid winding 115, so that the spring 111 effective on the armature 105 within the solenoid winding 115 is effective to return the armature and connected piston 106 back into their illustrated positions in which the piston 106 is on its seat 110 and opens the cavity 107 with respect to the openings 113 in the associated spring retainer 112. Atmospheric pressure enters this cavity 107 through the openings 113 and the chamber A in the servo-motor casing 85 through the conduit 114, so that the spring 89 is effective to move the piston 82 and thereby the pressure plate 60 connected with the piston 82 back into their illustrated positions in which the clutch 51 is disengaged.

For a left turn with a substantial steering load, the contact 120 is moved into contact with the contact 124 due to the resiliency of the rubber blocks 78. The relay winding 137 is thus energized closing the contacts 140 and 141. The contacts 140 and 141 connect the switch 119, which is assumed to be closed, and thereby the battery 147 with the solenoid winding 117. The solenoid winding 117 when energized moves the armature 105 within the winding 117 and the connected piston 106 so as to bring this piston onto its seat 109 and off its seat 110 against the action of the associated spring 111. Vacuum is thus supplied to the chamber B in the servo-motor casing 85 through the conduits 116 and 104 similarly as has been previously described for a right hand turn in connection with the chamber A. The piston 82 in the servo-motor 85 is thus moved to the right as seen in Fig. 5 against the action of the spring 90 thereby moving the sleeve 61 and pressure plate 60 to the right through the connection between the sleeves 86 and 61 previously decribed. The clutch 52 is thus engaged and transmits a turning movement from the ring gear 38, which is rotating in a direction opposite that of the ring gear 37 due to the meshing relation of the gears 38 and 40, to the shaft 23 and thereby to the steering wheels 15. When the clutch 52 has caused sufficient movement of the shafts 23 and 35 to correspond to the movement given the shaft 75 by the steering wheel 17, the contact 124 will move out of contact with the contact 120 to deenergize the relay 135 and the solenoid winding 117 connected with this relay. The armature 105 within the winding 117 and the connected piston 106 will thus return to their Fig. 5 positions in which the piston disconnects the manifold 101 with the chamber B and instead connects this chamber B with atmospheric pressure, so that the spring 90 is effective to move the piston 82, the sleeves 86 and 61 and the pressure plate 60 back into their illustrated positions in which the clutch 52 is disengaged.

The limit switch 119 is effective for preventing engagement of the clutches 51 and 52 when the shafts 23 and 35 have turned a predetermined amount in either direction which is just short of that which would cause the pitman arm 13 to contact either of the abutments 33 on the pitman arm stop 31. The plate 129, when the shaft 35 is rotated in one direction or the other, moves along the shaft 35 due to its threaded connection with the shaft. The plate 129 is prevented from rotating due to its tang 130 slidably disposed in the slot 131 in the casing 34. When the shaft 35 has rotated in a direction causing a right turn of the vehicle sufficiently that the pitman arm 13 is adjacent one of the stop portions 33, the plate 129 will have moved axially on the shaft 35 sufficiently so as to contact and move the switch arm 133 to bring its contact 134 out of contact with the other contact 134 on the arm 132. The electrical circuits to the relays 135 and 136 and solenoid windings 115 and 117 are thus opened, and the contacts 134 remain open until the shaft 35 is rotated sufficiently by manual effort through the coupling 76 to move the plate 129 out of engagement with the switch arm 133. The action is the same when the shaft 35 is rotated in the direction for a left turn; in this case the plate 129 makes contact and moves the switch arm 132 to move its contact 134 out of contact with the other contact 134 to open the switch 119.

The one-way clutch 44 is effective to allow a rotation of the gear 39, in the direction in which it is ordinarily driven from the vehicle engine crankshaft 73, if there is some break in the driving connection between the shaft 36 and the crankshaft 73. Such movement would be given the gear 39 through the clutches 51 and 52 and the gears 37 and 38 under power from the steering wheel 17, and the vehicle can thus be steered even though the belt 68 should break, for example. Under these conditions, the switch 118 will cause either the clutch 51 or the clutch 52 to become engaged when the steering wheel is turned due to the action of the flexible coupling 76, as has been previously described. When one or the other of the clutches 51 or 52 is thus engaged, the ring gear 37 or the ring gear 38 is rotated along with the shafts 23 and 35 from the shaft 75 through the flexible coupling 76, and the gears 40, 41 and 39 rotate along with the ring gear. The cam surfaces 47 of the one-way clutch 44 can overrun, and it thus will not be necessary to rotate the parts between the belt 68 and the shaft 36 by manual force as the vehicle is steered under these conditions.

Our improved power steering mechanism advantageously utilizes an extraneous source of power for engaging either of the clutches for transmitting power from the crankshaft 73 to the vehicle steering wheels. The power steering mechanism is therefore definite and positive in its action, and a minimum of manual force is required in controlling the steering mechanism. The limit switch 119 is effective for preventing engagement of either of the clutches in the unit 10 whenever such engagement would cause an excessive turning movement to be given the vehicle steering wheels 15.

We wish it to be understood that our invention is not to be limited to the specific constructions and arrangements shown and described, except only in so far as the claims may be so limited, as it will be apparent to those skilled in the art that changes may be made without departing from the principles of the invention.

What is claimed is:

1. In steering mechanism for a vehicle, a steering shaft adapted to be manually operated by means of a steering hand wheel, an output shaft adapted for connection with the steering ground wheels of the vehicle, a lost motion connection between said shafts, engageable means for driving said output shaft in one direction or the other, a motor for engaging said engageable means for a drive in either direction, and controlling mechanism for said motor controlled by said lost motion connection.

2. In steering mechanism for an engine driven vehicle, a steering shaft adapted to be manually operated by means of a steering hand wheel, an output shaft adapted for connection with the steering ground wheels of the vehicle, a lost motion connection between said shafts, two driven elements adapted to be rotated respectively in opposite directions from the engine of the vehicle, clutches for driving said output shaft alternately from said driven elements, a motor for engaging one or the other of said clutches, and controlling mechanism for said motor actuated by said lost motion connection.

3. In steering mechanism for an engine driven vehicle having a fuel intake manifold constituting a source of vacuum, a steering shaft adapted to be manually operated by means of a steering hand wheel, an output shaft adapted for connection with the steering ground wheels of the vehicle, a lost motion connection between said shafts, two driven elements adapted to be rotated respectively in opposite directions from the engine of the vehicle, clutches for driving said output shaft alternately from said driven elements, a vacuum motor for engaging one or the other of said clutches, and valve means connected with said motor and adapted to be connected with the fuel intake manifold of the vehicle engine and controlled by said lost motion connection for thereby controlling said motor and said clutches.

4. In steering mechanism for an engine driven vehicle having a fuel intake manifold constituting a source of vacuum, a steering shaft adapted to be manually operated by means of a steering hand wheel, an output shaft adapted for connection with the steering ground wheels of the vehicle, a lost motion connection between said shafts, two driven elements adapted to be rotated respectively in opposite directions from the engine of the vehicle, a pair of clutches for driving said output shaft alternately from said driven elements and including a single pressure plate which is movable in one direction to engage one of the clutches and is movable in the other direction to engage the other of said clutches, a vacuum motor connected with said pressure plate for moving the plate in one or the other direction for engaging one or the other of said clutches, and valve means under the control of said lost motion connection and connected with said motor and adapted to be connected with the fuel inlet manifold of the vehicle engine for applying vacuum to the vacuum motor from the manifold when said steering shaft is operated.

5. In steering mechanism for an engine driven vehicle, a steering shaft adapted to be manually operated by means of a steering hand wheel, an output shaft adapted for connection with the steering ground wheels of the vehicle, a lost motion connection between said shafts, two driven elements adapted to be rotated respectively in opposite directions from the engine of the vehicle, clutches for driving said output shaft alternately from said driven elements, an electrically controlled motor for engaging one or the other of said clutches, and switch means actuated by said lost motion connection for causing said motor to engage one or the other of said clutches depending on the direction in which said steering shaft is turned.

6. In steering mechanism for an engine driven vehicle, a steering shaft adapted to be manually operated by means of a steering hand wheel, an output shaft adapted for connection with the steering ground wheels of the vehicle, a lost motion connection between said shafts, two driven elements adapted to be rotated respectively in opposite directions from the engine of the vehicle, a pair of clutches for driving said output shaft alternately from said driven elements and including a common pressure plate adapted to engage one of the clutches when moved in one direction and adapted when moved in the other direction to engage the other of said clutches, a motor connected with said pressure plate for moving the plate in one direction or the other, and electrical controlling mechanism for said motor including two electric switch means for alternately causing the motor to move the clutch plate in one direction or the other and completed when said steering shaft is turned in one direction or the other.

7. In steering mechanism for an engine driven vehicle having a fuel intake manifold constituting a source of vacuum, a steering shaft adapted to be manually operated by means of a steering hand wheel, an output shaft adapted for connection with the steering ground wheels of the vehicle, a lost motion connection between said shafts, two driven elements adapted to be rotated respectively in opposite directions from the engine of the vehicle, clutches for driving said output shaft alternately from said driven elements, a vacuum motor connected with said clutches for engaging one or the other of the clutches, a pair of valves connected with said vacuum motor and adapted to be connected with the fuel intake manifold of the vehicle engine for energizing said motor to cause one or the other of said clutches to be engaged, an electric solenoid for actuating each of said valves, and electric switch means controlled by said lost motion connection and electrically connected with said solenoids for controlling said valves and thereby controlling said clutches as said steering shaft is turned.

8. In steering mechanism for an engine driven vehicle having a fuel intake manifold constituting a source of vacuum, a steering shaft adapted to be manually operated by means of a steering hand wheel, an output shaft adapted for connection with the steering ground wheels of the vehicle, a lost motion connection between said shafts, two driven elements adapted to be rotated respectively in opposite directions from the engine of the vehicle, a pair of axially aligned clutches for driving said output shaft alternately from said driven elements and having a common pressure plate which when moved in one direction engages one of the clutches and when moved in the opposite direction engages the other of the clutches, a vacuum motor effective on said pressure plate for engaging one or the other of said clutches, a valve adapted to connect the fuel inlet manifold of the vehicle engine with one side of said motor for moving said pressure plate in one direction to engage one of the clutches and a valve adapted to connect the fuel inlet manifold with the other side of said motor for moving said pressure plate in the opposite direction for engaging the other of said clutches, an electric solenoid connected with each of said valves for opening the vacuum connection through the valve when the solenoid is energized, and electrical energizing means for said solenoids and including a switch actuated by said lost motion connection when said steering shaft is turned in one direction for energizing one of the solenoids and a second switch actuated by said lost motion connection when said steering shaft is turned in the opposite direction for energizing the other of said solenoids.

9. In steering mechanism for a vehicle, a steering shaft adapted to be manually operated by means of a steering hand wheel, an output shaft adapted for connection with the steering ground wheels of the vehicle, a lost motion connection between said shafts, engageable means for driving said output shaft in one direction or the other, a motor for engaging said engageable means for a drive in either direction, controlling mechanism for said motor controlled by said lost motion connection, and limiting means responsive to the degree of turning given one of said shafts for maintaining said motor deactivated regardless of the condition of said lost motion connection after the latter shaft has been turned a predetermined degree in either direction.

10. In steering mechanism for an engine driven vehicle, a steering shaft adapted to be manually operated by means of a steering hand wheel, an output shaft adapted for connection with the steering ground wheels of the vehicle, a lost motion connection between said shafts, two driven elements adapted to be rotated respectively in opposite directions from the engine of the vehicle, clutches for driving said output shaft alternately from said driven elements, a motor for engaging one of the other of said clutches, controlling mechanism for said motor actuated by said lost motion connection, and limiting means responsive to the degree of turning given one of said shafts for maintaining said motor deactivated regardless of the conditions of said lost motion connection after the latter shaft has been turned a predetermined degree in either direction.

11. In steering mechanism for a vehicle, a steering shaft adapted to be manually operated by means of a steering hand wheel, an output shaft adapted for connection with the steering ground wheels of the vehicle, a lost motion connection between said shafts, engageable means for driving said output shaft in one direction or the other, means to effect engagement of said engageable means for a drive in either direction including electrically responsive means, controlling mechanism for said electrically responsive means and including electric switch means controlled by said lost motion connection, and electric switch means responsive to the degree of turning given said steering shaft for maintaining said electrically responsive means deactivated regardless of the condition of said lost motion connection after the steering shaft has been turned a predetermined degree in either direction.

12. In steering mechanism for a vehicle, a steering shaft adapted to be manually operated by means of a steering hand wheel, an output shaft adapted for connection with the steering ground wheels of the vehicle, a lost motion connection between said shafts, engageable means for driving said output shaft in one direction or the other, means to effect engagement of said engageable means for a drive in either direction including electrically responsive means, controlling mechanism for said electrically responsive means and including a pair of switch means controlled by said lost motion connection for causing said engageable means to drive said output shaft in one direction or the other when said steering shaft is turned in one direction or the other, and limiting switch means in series with said first named switch means and responsive to the degree of turning given said steering shaft for maintaining said electrically responsive means deactivated regardless of the condition of said lost motion connection after the steering shaft has been turned a predetermined degree in either direction.

13. In steering mechanism for an engine driven vehicle, a steering shaft adapted to be manually operated by means of a steering hand wheel, an output shaft adapted for connection with the steering ground wheels of the vehicle, a lost motion connection between said shafts, two driven elements adapted to be rotated respectively in opposite directions from the engine of the vehicle, at least a pair of clutches for driving said output shaft from said driven elements, means to effect engagement of one or the other of said clutches including electrically responsive means, controlling mechanism for said electrically responsive means and including a switch means actuated by said lost motion connection when said steering shaft is turned in one direction and switch means actuated by said lost motion connection when said steering shaft is turned in the other direction for engaging one or the other of said clutches, and limiting switch means connected in series with said two first named switch means and responsive to the degree of turning given said steering shaft for maintaining said electrically responsive means deactivated regardless of the condition of said lost motion connection after the steering shaft has been turned a predetermined degree in either direction.

14. In steering mechanism for an engine driven vehicle having a fuel intake manifold constituting a source of vacuum, a steering shaft adapted to be manually operated by means of a steering hand wheel, an output shaft adapted for connection with the steering ground wheels of the vehicle, a lost motion connection between said shafts, two driven elements adapted to be rotated respectively in opposite directions from the engine of the vehicle, clutches for driving said output shaft alternately from said driven elements and including a common pressure plate which is moved in one direction for engaging one of the clutches and is moved in the opposite direction for engaging the other of said clutches, a vacuum motor for moving said pressure plate in one direction or the other for engaging one or the other of said clutches, a pair of valves adapted to connect the fuel inlet manifold with opposite sides of said vacuum motor for moving said pressure plate in one direction or the other, an electric solenoid for operating each of said valves to open said motor to vacuum when the solenoid is energized, means for energizing said solenoids and including a pair of electric switch means connected with said lost motion connection and actuated when said steering shaft is turned in one direction or the other and each electrically connected with one of said solenoids, and limiting switch means connected in series with said two first named switch means and responsive to the degree of turning given said steering shaft for maintaining said vacuum motor deactivated regardless of the condition of said lost motion connection after the steering shaft has been turned a predetermined degree in either direction.

References Cited in the file of this patent

UNITED STATES PATENTS

| | | |
|---|---|---|
| 1,376,271 | Gouge | Apr. 26, 1921 |
| 2,311,010 | Vickers | Feb. 16, 1943 |
| 2,553,795 | Staude | May 22, 1951 |
| 2,587,377 | Penrose | Feb. 26, 1952 |